United States Patent [19]
Hosoya

[11] Patent Number: 5,262,821
[45] Date of Patent: Nov. 16, 1993

[54] CONDITION SETUP/UPKEEP PRINT

[75] Inventor: Mitsukazu Hosoya, Kanagawa, Japan

[73] Assignee: Fuji Photo Film Co., Ltd., Kanagawa, Japan

[21] Appl. No.: 896,655

[22] Filed: Jun. 10, 1992

[30] Foreign Application Priority Data

Jun. 17, 1991 [JP] Japan .................. 3-144960

[51] Int. Cl.$^5$ .................................. G03B 27/72
[52] U.S. Cl. ........................ 355/035; 355/38; 355/41
[58] Field of Search ............. 355/32, 35, 38, 77, 355/41

[56] References Cited

U.S. PATENT DOCUMENTS

| | | | |
|---|---|---|---|
| 4,174,173 | 11/1979 | Pone, Jr. .................. | 355/38 |
| 4,175,853 | 11/1979 | Harvey ..................... | 355/38 |
| 4,999,668 | 3/1991 | Suzuki et al. ............. | 355/38 |
| 5,001,512 | 3/1991 | Kubota ..................... | 355/38 |
| 5,182,594 | 1/1993 | Hopson ..................... | 355/77 X |

FOREIGN PATENT DOCUMENTS 61-97656 5/1986 Japan .
61-174527 8/1986 Japan .
63-234234 9/1988 Japan .

Primary Examiner—Richard A. Wintercorn
Attorney, Agent, or Firm—Sughrue, Mion, Zinn, Macpeak & Seas

[57] ABSTRACT

Disclosed herein is a condition setup/upkeep print for either setup or upkeep of normal exposure conditions of a photographic printer. A plurality of images are formed by copying images of standard negative films on the setup/upkeep print under given copy conditions, and an identification mark is applied on the print. The identification mark is set in such a manner that copy conditions such as the kinds of the standard negative films and exposed states are represented as a set of identification marks in association with each of the plurality of images. The copy conditions of the images are identified by the identification mark applied on the print. Either setup or upkeep of the normal exposure conditions of the photographic printer can accurately be performed.

23 Claims, 6 Drawing Sheets

CONDITION SETUP/UPKEEP PRINT

BACKGROUND OF THE INVENTION

1. Field of the Invention

The present invention relates to a print for either setup or upkeep of normal exposure conditions of a photographic printer.

2. Description of the Related Art

In order to develop a color print in which density and hue of an image are at an optimum, it is necessary for a photographic printer to control a developer, correctly carrying out a developing process and set proper normal exposure conditions of the printer to devices. Therefore, the normal exposure conditions are set when the printer is installed. However, when color papers whose emulsion numbers are different from each other are used, an exposure lamp of the exposure unit is replaced, developer is replaced, or the contents of a picture change from a colorful content to a non-colorful content or vice versa upon a change of season, printing conditions vary accordingly. It is therefore necessary to modify and reset the normal exposure conditions. In addition, the printing conditions may change due to deterioration of a light-source system including a dimming filter, halogen lamp and a reflector or the like. It is therefore necessary to modify the exposure conditions and reset them in the same manner as described above.

When the normal exposure conditions are modified, a standard negative film on which a circular and gray-colored object has centrally been photographed is used. In addition, the density of a test print (hereinafter called a "sample print") printed and developed from the standard negative film is compared with that of a previously printed and developed reference print and the difference in the density therebetween is modified. This comparison process is referred to as a "condition production or yielding process". Incidentally, the standard negative film is generally called a bull's eye negative film in view of the shape of an image formed thereon. The standard negative film will hereinafter be referred to as the "bull's eye negative film".

Generally negative films are not always exposed in a proper exposure state. Therefore, there has recently been proposed a photographic printer having a function for detecting the exposed states of the negative film. The negative films are then exposed according to the detected exposed state. With this type of photographic printer, the normal exposure conditions corresponding to the exposed states of the negative films have been set in advance. It is necessary to modify the normal exposure conditions corresponding to the exposed states of these negative films in a manner similar to the above-mentioned normal exposure conditions. Therefore, there have previously been prepared bull's eye negative films subjected to exposure under four kinds of exposure conditions such as a normal exposure, an underexposure, an overexposure and a superexposure. The photographic printer finely modifies the normal exposure conditions and sets them by using the respective bull's eye negative films.

In order to produce or yield conditions for the photographic printer, a master balance control, a paper balance control, a lens balance control, a negative balance control, etc. are known. Master balance control is performed when processes such as the changing of processing liquids such as a developer, the replacement of the lamp for a light source, the replacement of color paper with the same emulsion number, etc. are carried out. Paper balance control is carried out when the surface of the color paper is changed and when the emulsion number is changed. Lens balance control is effected when the lens is changed. In addition, the negative film balance is made to change an exposure condition corresponding to an exposed state of a negative film. In general, the conditions are suitably produced or yielded in the form of corresponding contents before each work day or at regular intervals, or each time a lamp of an exposure unit is replaced, when respective processing liquids in a processor are replaced and color paper is replaced.

However, an operation for producing the conditions of the photographic printer is carried out so that the exposure time of bull's eye negative films on which images are recorded, the densities of respective images of the negative films are gradually changed so as to create sample prints, and the image densities of the sample prints are compared with those of reference prints. Thus, since prints formed from similar images are used in large numbers upon yielding or producing the conditions, they are liable to be mixed up and the process is cumbersome. When the firstly-created sample print is used as a reference print in particular, an operator tends to use a sample print produced under different exposure conditions. Accordingly, when the exposure conditions of the photographic printer are established, the quality of the created prints is impaired.

SUMMARY OF THE INVENTION

With the foregoing problems in view, it is an object of the present invention to provide a condition setup/upkeep print capable of simply and reliably carrying out a process for producing normal exposure conditions of a photographic printer.

According to a first aspect of the present invention, there is provided a condition setup/upkeep print for either setup or upkeep of normal exposure conditions of a photographic printer, which comprises a plurality of images each formed by copying an image on the print under at least two kinds of different given copy conditions, and copy condition indicating means for indicating copy conditions for each of the plurality of images, the copy conditions being indicated as a set of identification characters on the same print with the plurality of images.

According to the condition setup/upkeep print described above, the copy condition indicating means represents the copy conditions of the copied images. In addition, the copy condition indicating means represents that the print referred to above is a condition setup/upkeep print which is different from a normal print, for modifying exposure conditions of a photographic printer. The copy conditions include the presence and absence and kinds of standard negative films, exposed states of the negative films, the exposure time or light exposure of the standard negative films, etc. When a plurality of images are continuously copied on a print, the copy condition indicating means may be one which has represented copy conditions associated with the respective images. Alternatively, the above means may be one which has represented any of previously-set combinations of these copy conditions. Further, this means may be one added with a mark for indicating the print referred to above as a condition setup/upkeep print. When the condition setup print is a sample print for modifying the normal exposure conditions of the photographic printer, for example, the copy condition indicating means may be provided upon copying operation. Thus, when the density of an image on the sample print is measured, the copy condition indicating means can determine that the print is of a condition producing print, and identify a copy condition of a copied image. When the condition setup/upkeep print is used as a reference print, the copy condition indicating means can accurately determine the copy condition of the copied image. Incidentally, the copy condition indicating means may be one which detects the copy condition before the density of the image is measured. Alternatively, it may be one which detects it after the density of the image has been measured. Any copy condition indicating means may be used as long as it is disposed on the same print as an image.

A condition setup/upkeep print according to a second aspect of the present invention corresponds to the condition setup/upkeep print according to the first aspect. The condition setup/upkeep print has image position indicating means disposed at a position corresponding to each image so as to indicate the positions of the plurality of images.

The image position indicating means of the condition setup/upkeep print indicates each of the positions of the images. The density measuring unit disposed in the photographic printer also detects the image position indicating means thereby enabling the position of each image to be accurately identified. The image position indicating means may be disposed in confronting relationship with each image. Alternatively, the image position indicating means may be constructed in a manner as to indicate the position of an image on the most downstream side, of a series of images, i.e., an image firstly conveyed to the density measuring unit when copy condition indicating means is detected before the measurement of the image density and a data of given number of images are set to the copy condition indicating means.

A condition setup/upkeep print according to a third aspect of the present invention is identical to the condition setup/upkeep print according to the second aspect. The condition setup/upkeep print has image copying regions on which the images are successively copied in a plurality of numbers, and mark forming regions offset or shifted along the line of the plurality of images and including the copy condition indicating means and the image position indicating means both disposed in series.

The condition setup/upkeep print according to the third aspect of the present invention is constructed in such a manner that the image copying regions and the mark forming regions are offset. By forming a plurality of images only on a main part of the image copying regions, the overall size of the condition setup/upkeep print can be reduced even if the images are copied in large numbers. Therefore, a condition producing process can reliably be carried out in a short period of time. Since the image position indicating means is disposed in series with the copy condition indicating means, the image position indicating means can also be detected by using means for detecting the copy condition indicating means upon measurement of the image density. It is therefore unnecessary to provide special positioning means in order to position each image in the density measuring unit. That is, condition producing images, image copying conditions and image positions are recorded on the same print as the condition setup/upkeep print according to the present invention. Therefore, when the photographic printer measures the density of an image, the density measuring unit detects the copy condition indicating means and determines that the condition producing process is carried out based on the result of its detection. In addition, the density measuring unit detects the image position indicating means thereby enabling the position of the image to be suitably determined. Thus, the photographic printer can automatically produce or yield desired conditions on the basis of images recorded on the condition setup/upkeep print so as to modify and establish the normal exposure conditions. The condition yielding of the photographic printer makes it unnecessary yo perform various operations by an operator. It is also possible to avoid any failure in the set-up of exposure conditions, which takes place due to operational mistakes by the operator. In addition, a density measuring device for measuring the density of each image on the condition setup/upkeep print can be simplified in structure.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

A preferred embodiment of the present invention will hereinafter be described in detail with reference to the accompanying drawings.

Figure 1:
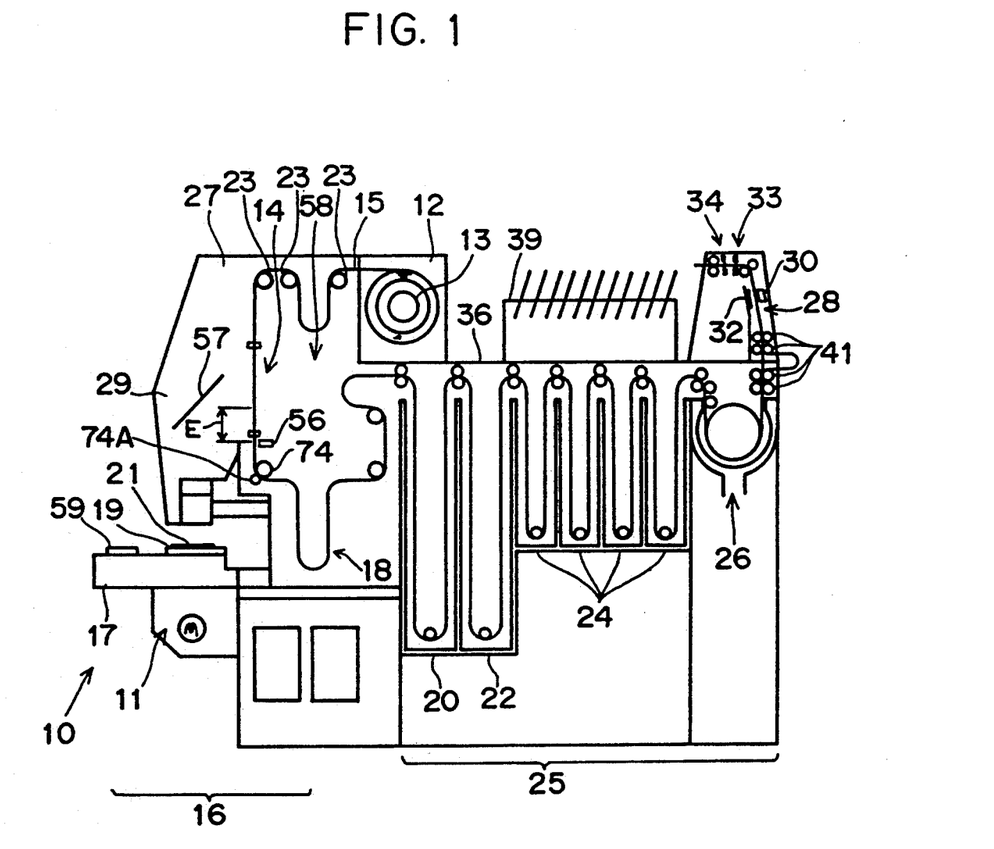
FIG. 1 is a schematic view showing the structure of a printer processor for processing a condition producing print according to one embodiment of the present invention.

FIG. 1 shows a printer processor 10 as one part of a photographic printer. When normal exposure conditions or the like are modified or corrected, the printer processor 10 produces a condition producing print 54 as a condition setup/upkeep print to which the present invention is to be applied. Then, the printer processor 10 measures the density of each image copied or printed on the print 54 thereby automatically producing or yielding desired conditions.

The printer processor 10 is externally covered by a casing 36. A working table 17 projects from the casing 36. A negative-film carrier 19 loaded with a negative film 21 is placed on the upper surface of the working table 17. A control panel 59 having a keyboard is disposed on the working table 17. By entering commands through the keyboard of the control panel 59, the printer processor 10 is operated.

On the other hand, a light source unit 11, which forms one part of a copying unit 16, is disposed below the working table 17. The light source unit 11 includes an unillustrated light source and a plurality of unillustrated filters. Light emitted from the light source is transmitted through the filters to the negative film 21 loaded in the carrier 19.

A optical system 29, which forms a part of the copying unit 16, is mounted on an arm 27 which projects from the printer processor 10. The optical system 29 has an unillustrated lens, a shutter and an optical-path switching mirror 57, and is disposed in the optical axis of the light. The light, which has passed through the negative film 21, passes through the lens and the shutter. The optical path of the transmitted light is switched by the optical-path switching mirror 57. Thereafter, an image of the negative film 21 is focused on color paper 15 set in an exposure chamber 14, thereby enabling the image of the negative film 21 to be copied on the color paper 15.

The printer processor 10 has a paper magazine 12 provided adjacent to the exposure chamber 14, for winding an elongated color paper 15 serving as a copying light-sensitive material onto a reel 13 in layer form. The exposure chamber 14 has a plurality of rollers 23 disposed therein and a feed unit 58 for conveying the color paper 15 in a desired direction within the exposure chamber 14 with the color paper 15 interposed between the respective rollers 23. The color paper 15 onto which the image of the negative film 21 has been copied in the exposure chamber 14, is conveyed to a reservoir 18 disposed adjacent to the exposure chamber 14.

A hole punching device 56 for punching holes in both transversely-extending ends of the color paper 15 is mounted between the exposure chamber 14 and the reservoir 18 so that an interval defined between the position where each hole is punched in the color paper 15 and the central position at which an image is exposed in the exposure chamber 14 is set to a distance E. A conveying roller 74 and a roller 74A are disposed on the downstream side of the hole punching device 56 as seen in the color paper conveying direction.

Figure 4:
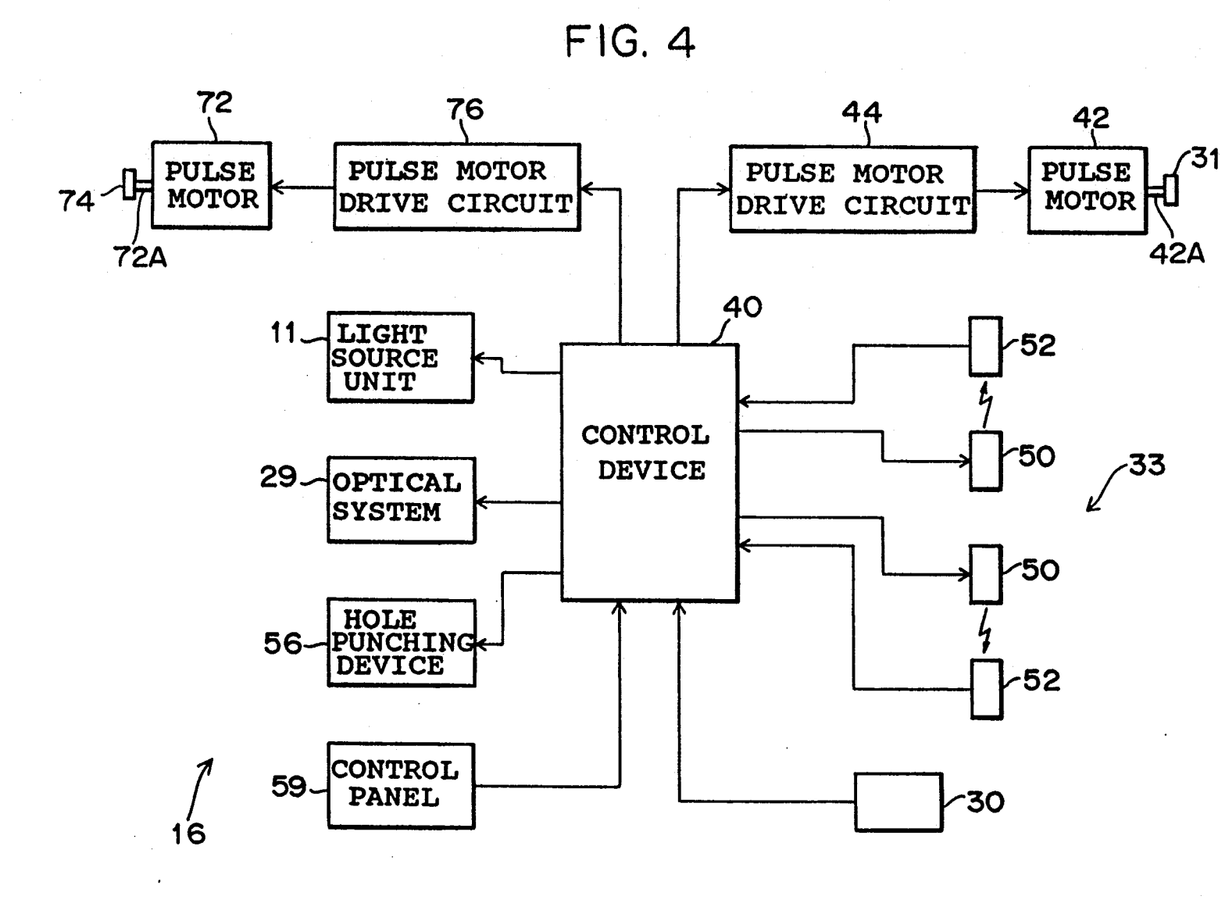
FIG. 4 is a block diagram illustrating a controller of the processor.

As illustrated in FIG. 4, the hole punching device 56 is connected to and operated by a control device 40. The conveying roller 74 is mounted to a rotating shaft 72A of a pulse motor 72. A driving force produced by the pulse motor 72 is transmitted to the conveying roller 74 thereby rotating the conveying roller 74. Thus, the color paper 15 is conveyed in a desired direction while being sandwiched between the conveying rollers 74, 74A. The pulse motor 72 is connected via a pulse motor drive circuit 76 to the control device 40 in such a manner as to be driven by the control device 40.

The control panel 59, the optical system 29 and the light source unit 11 are also respectively connected to the control device 40. The keys on the keyboard of the control panel 59 are operated so as to cause the control device 40 to control the optical system 29 and the light source unit 11, thereby enabling an exposure process for the color paper 15.

Figure 3A:
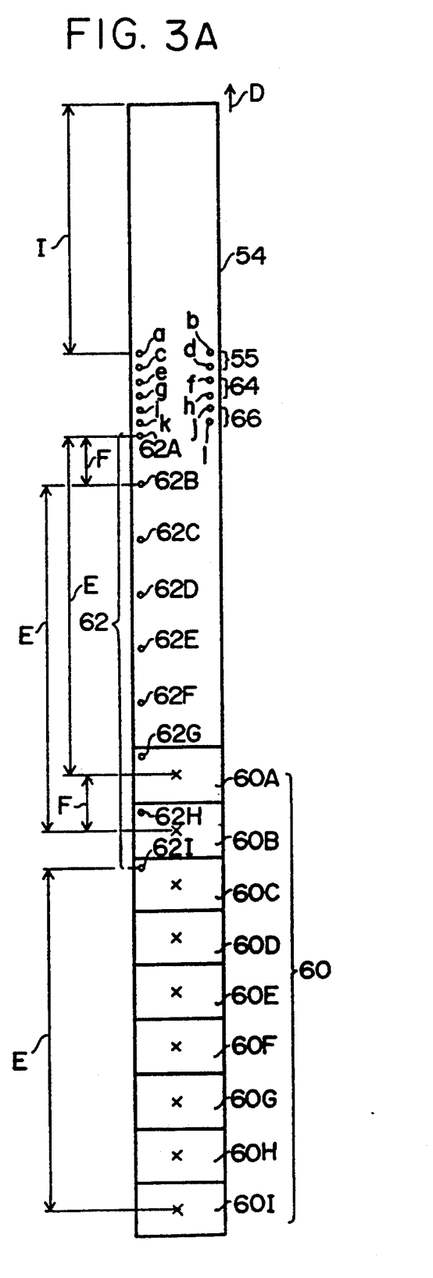
FIG. 3A is a plan view illustrating the condition producing print.

When the condition producing print 54 is created as a sample print in order to yield conditions for the printer processor 10, a command is entered through the keyboard of the control panel 59 to cause the control device 40 to activate the hole punching device 56 thereby punching holes in a color paper 15. Thus, after the leading end of the color paper 15 has been conveyed in a desired direction by a distance I, the hole punching device 56 successively punches holes a, b and c, d as a print ID55 in the color paper as illustrated in FIG. 3A. Further, the hole punching device 56 punches holes e, f in predetermined positions.

Figure 3B:
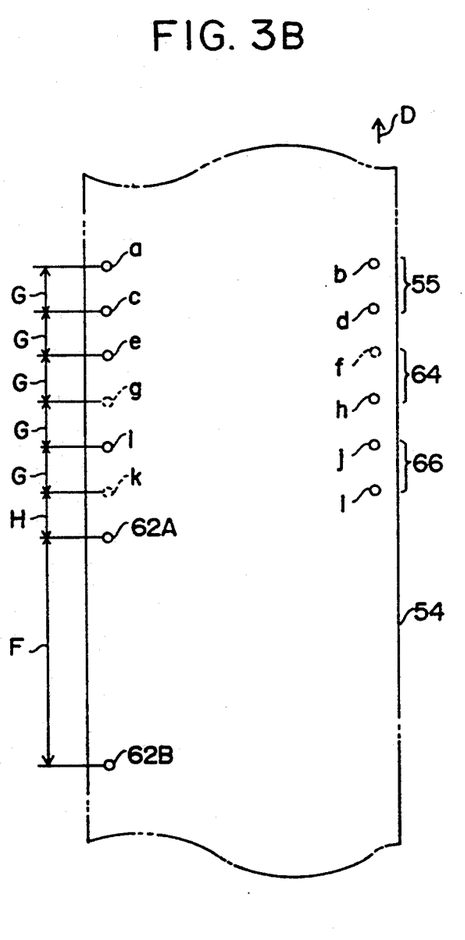
FIG. 3B is a fragmentary plan view showing the print shown in FIG. 3A.

In the present embodiment, a plurality of information are identified according to a determination made as to whether the holes e through l have been punched (FIG. 3A). That is, the punched holes e through h are combined into a large classification ID64, as illustrated in FIG. 3B whereas the punched holes i through l are combined into a small classification ID66. The large classification ID64 exhibits a working section at the time that exposure conditions are established. The small classification ID66 represents the exposure time of a series of images to be exposed and variations in the exposure or an increase or decrease in the exposure by each filter. The large classification ID64 and the small classification ID66 are preset according to the number of the punched holes e through l. The punched holes a through l are placed at equal intervals of distances G. Thereafter, the color paper 15 is conveyed through distance H in the same direction referred to above so as to copy the images 60 thereon. Incidentally, as shown in FIG. 3B those areas indicated by solid lines are holes a e, h, i, j, i whereas the remaining areas indicated by broken lines f, g, k are where no holes have been punched.

Next, the control device 40 shown in FIG. 4 activates the optical system 29 and the light source unit 11 to copy an image of the negative film 21 onto the color paper 15 as an image 60A and to activate the hole punching device 56 to punch a hole 62A as an image positioning mark in one of the transversely-extending ends of the color paper 15. As a result, as shown in FIG. 3A, the punched hole 62A corresponding to the image 60A is formed in a position on the downstream side of the image 60A, which is spaced a distance E along the color paper conveying direction (i.e., in the direction indicated by the arrow D in FIG. 3A) from a density measuring position (indicated by "x" in FIG. 3A) of the image 60A. Similarly, punched holes 62B through 62I corresponding to other images 60B through 60I are successively defined in respectively corresponding positions in a series at intervals of distances F along the color paper conveying direction. In the present embodiment, nine images can be copied on a single condition producing print 54. In addition, the print 54 is formed with mark forming regions between the punched holes a and l and between 62A and 62I and image regions between the images 60A and 60I.

Referring now to FIG. 1, the reservoir 18 stocks exposed color paper 15 therein and compensates for the difference between a time interval required for the copying unit 16 to apply exposure processing to a color paper 15 and a time interval required for a processor 25 to apply development, fixing and water cleaning to the color paper 15. The color paper 15 discharged from the reservoir 18 is conveyed to a color-producing developer 20 of the processor 25 disposed adjacent to the reservoir 18.

The color-producing developer 20 serves to wet the color paper 15 with a developer so as to subject it to development. Afterwards, the developed color paper 15 is conveyed to a bleaching fixing unit 22 disposed adjacent the color-producing developer 20. The bleaching fixing unit 22 serves to wet the color paper 15 with a liquid fixer so as to subject it to a fixing process. The color paper 15, which has been subjected to the fixing process, is conveyed to washing units 24 disposed adjacent to the bleaching fixing unit 22. Each of the washing units 24 wets the color paper 15 with washing water so as to subject it to a washing process. The color paper 15, which has been subjected to the washing process, is conveyed to a drying unit 26 disposed adjacent to the washing units 24. In the drying unit 26, the color paper 15 is wound round a roller and dried with hot air.

Figure 2:
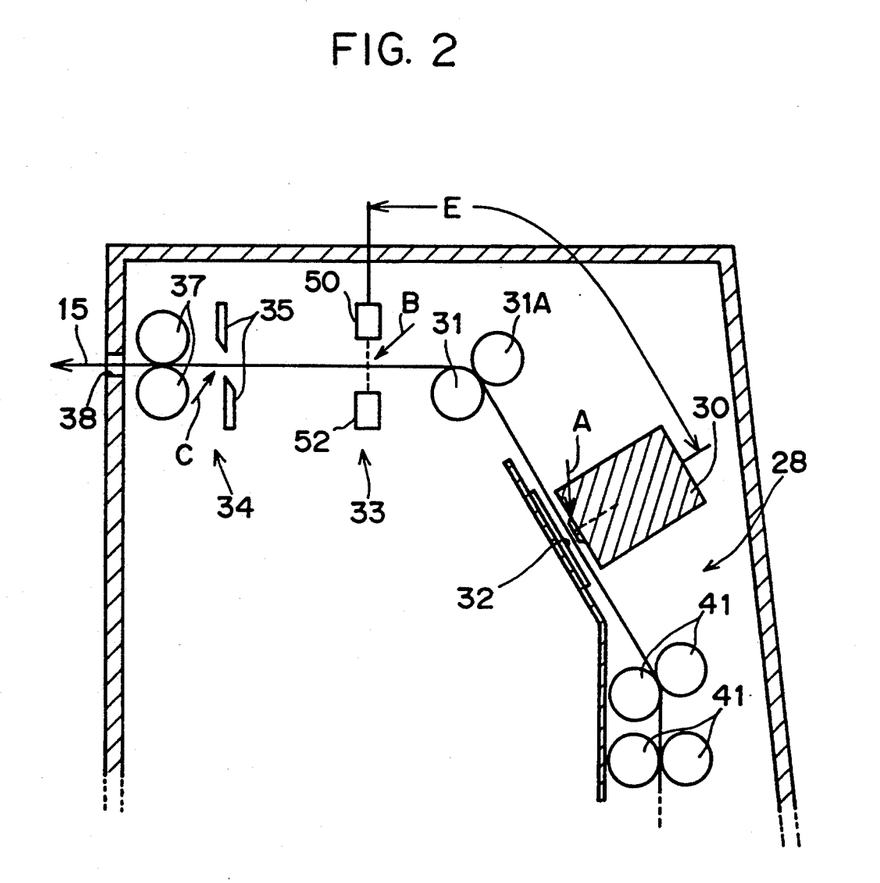
FIG. 2 is a cross-sectional view schematically showing a portion near an image density measuring unit.

The color paper 15, which has passed through the drying unit 26, is guided between a plurality of pairs of rollers 41 and then conveyed to a density measuring unit 28 disposed above the drying unit 26. As shown in FIG. 2, the density measuring unit 28 includes a densitometer 30 and a reference print 32 having a standard density. The densitometer 30 and the reference print 32 are disposed in confronting relationship to each other with a conveying path for the color paper 15 located therebetween. As illustrated in FIG. 4, the densitometer 30 is connected to the control device 40. The densitometer 30, whose measuring position is above the film conveying path (indicated by the arrow A in FIG. 2), measures the density of the color paper 15 and the density of the reference print 32 and then outputs the results of measurements to the control device 40.

As shown in FIG. 2, a conveying roller 31 and a roller 31A are disposed on the downstream side of the density measuring unit 28 as seen from the color paper conveying direction. As illustrated in FIG. 4, the conveying roller 31 is mounted to a rotating shaft 42A of a pulse motor 42. A driving force produced from the pulse motor 42 is transmitted to the conveying roller 31 thereby rotating the conveying roller 31. Thusly, the color paper 15 is conveyed in a desired direction while being sandwiched between the conveying roller 31 and the roller 31A. The pulse motor 42 is connected via a pulse motor drive circuit 44 to and driven by the control device 40.

As depicted in FIG. 2, a punched-hole detecting unit 33 is disposed on the downstream side of the densitometer 30 as seen from the color paper conveying direction. The punched-hole detecting unit 33 has a pair of light-emitting components 50 and a pair of light-receiving components 52 each pair of which is disposed in opposing relationship with the conveying path of the color paper 15 interposed therebetween. The light-emitting components 50 and the light-receiving components 52 are disposed above the corresponding transversely-extending ends of the color paper 15 (FIG. 2 shows only one side). A distance E is maintained along the conveying path of the color paper 15 between a position at which the light-emitting component 50 and the light-receiving component 52 are disposed, i.e., a punched-hole detecting position (indicated by the arrow B in FIG. 2) and a density measuring position of the density measuring unit 28.

As illustrated in FIG. 4, the light-emitting components 50 and the light-receiving components 52 are connected to the control device 40. The light-emitting components 50 are energized to illuminate the light-receiving components 52, which the light-emitting components 50 face, with a beam of light. Then, the light-receiving components 52 receive the light which has passed through the color paper 15 and converts the light into an electric signal. The converted electric signal is outputted to the control device 40. When the level of the electric signal output from the light-receiving components 52 is greater than or equal to a predetermined value, the control device 40 determines that desired punched holes have been detected.

When the punched holes a through d shown in FIG. 3 are detected, the control device 40 determines that a print with the punched holes a through d defined therein is a condition producing print 54. Thereafter, the control device 40 is activated to successively detect the punched holes e through l at intervals of the distances G while the condition producing print 54 is being conveyed. Accordingly, the control device 40 determines the contents of set exposure conditions and the contents of printed images, for example, and then stores therein information about the measured densities of the images 60. Next, the control device 40 is activated to cause the punched-hole detecting unit 33 to detect the punched holes a through l. Thereafter, punched holes 62 are detected by the punched-hole detecting unit 33. When the punched holes 62 are detected, the control device 40 is activated to cause the pulse motor 42 to temporarily stop rotating so as to measure the densities of the images 60 corresponding to each of the punched holes 62. Incidentally, the control device 40 in the printer processor 10 measures and compares two densities of images of the sample print and the reference print. Correspondingly, the control device 40 corrects exposure conditions in such a manner that the density of the sample print reaches that of the reference print.

As shown in FIG. 2, a cutter unit 34 is disposed on the downstream side of the punched-hole detecting unit 33 as seen from the color paper conveying direction. The cutter unit 34 has a pair of cutters 35 for cutting the color paper 15 and a pair of rollers 37. The cutters 35 are disposed in a confronting relationship with the conveying path for the color paper 15 running therebetween. The cutters 35 cut the color paper 15 at a cutting position indicated by the arrow C in FIG. 2 in the color paper conveying path. The cut color paper 15 is sandwiched between the rollers 37, conveyed and then discharged into a sorter 39 (shown in FIG. 1) disposed outside the casing 36 via an aperture or opening 38 so as to be accommodated therein.

In the present embodiment, the density measuring unit 28 measures only the density of the central portion of a recorded image. When the image is formed on the color paper 15 by exposure correspondingly, the outer peripheral region of the color paper 15 is subjected to a masking process, and only the central portion of the color paper 15 is subjected to exposure in association with an interval of a distance F as seen in the longitudinal direction of the color paper 15 (see FIGS. 3A and 3B). When the condition producing print 54 is produced, created data such as a date, etc. are printed on the reverse side of the color paper 15 by an unillustrated printer.

A description will now be made of a condition producing process of the printer processor 10 employed in the present embodiment. In the present embodiment, a large classification of the condition producing print 54 created by the printer processor 10 is divided into six groups or six prints, i.e., a round print, a condition setup print using a bull's eye negative film, a condition setup print using an ND filter, a time-sloping table print, a print for correction of a built-in densitometer, and a condition upkeep print, as shown in Table 1. The large classification ID64 is set according to the respective classifications. The small classification ID66 is established in accordance with the contents of work set by the respective large classifications.

TABLE 1

| | Large classification of print | Small classification of print | Print ID a | b | c | d | Large classification ID e | f | g | h | Small classification ID i | j | k | l |
|---|---|---|---|---|---|---|---|---|---|---|---|---|---|---|
| 1 | Round print | | 1 | 1 | 1 | 1 | 1 | 0 | 0 | 0 | 0 | 0 | 0 | 0 |
| 2 | Condition setup print (Bull's eye) | U,N,O 9 frames | 1 | 1 | 1 | 1 | 1 | 0 | 0 | 1 | 1 | 1 | 0 | 0 |
| | | U,N,O,Oo 8 frames | 1 | 1 | 1 | 1 | 1 | 0 | 0 | 1 | 1 | 1 | 0 | 1 |
| 3 | Condition setup print | N 9 frames | 1 | 1 | 1 | 1 | 1 | 0 | 1 | 0 | 0 | 0 | 0 | 0 |
| 4 | Time-sloping table | Exposure time = 260 msec | 1 | 1 | 1 | 1 | 1 | 0 | 1 | 1 | 1 | 1 | 0 | 0 |
| | | Exposure time = 1 sec | 1 | 1 | 1 | 1 | 1 | 0 | 1 | 1 | 1 | 1 | 0 | 1 |
| | | Exposure time = 1.8 sec | 1 | 1 | 1 | 1 | 1 | 0 | 1 | 1 | 1 | 1 | 1 | 0 |
| 5 | Built-in densitometer (3 × 3 settings) | Bull's eye | 1 | 1 | 1 | 1 | 1 | 1 | 0 | 0 | 1 | 1 | 0 | 0 |
| | | ND | 1 | 1 | 1 | 1 | 1 | 1 | 0 | 0 | 1 | 1 | 0 | 1 |
| 6 | Condition upkeep print (ND) | | 1 | 1 | 1 | 1 | 1 | 1 | 0 | 1 | 0 | 0 | 0 | 0 |

The bull's eye negative films as standard negative films are classified into four, i.e., an underexposure negative (U negative) film, a normal exposure negative (N negative) film, an overexposure negative (O negative) film, and a superexposure negative (Oo negative) film, which are represented by U, N, O and Oo respectively in Table 1. The print ID55, the large classification ID64 and the small classification ID66 are respectively represented by a combination of 0 and 1 defining the presence and absence of the holes a through d, a combination of 0 and 1 defining the presence and absence of the holes e through h and a combination of 0 and 1 defining the presence and absence of the holes i through l. That is, as represented by Table 1, "1" shows the presence of a punched hole, whereas "0" shows the absence of the punched hole. The presence and absence of the punched holes a through l are successively represented in the form of 0 and 1.

The round print is used for the following purpose. That is, the color tone is varied in order of the hue circle (i.e., in order of red, yellow, green, cyan, blue, magenta and red) thereby to produce or form nine prints comprising a deep-colored print, a light-colored print and a reference print. The most suitable print is visually selected from the nine prints. Then, an exposure condition corresponding to the selected print is set as a normal exposure condition. The condition setup print using the bull's eye negative film is used for the following purpose. That is, four bull's eye negative films are subjected to exposure under the normal exposure conditions corresponding to the respective negative films to produce sample prints. Then, the density of each sample print is compared with that of the reference print. As a result, the normal exposure conditions of the respective sample prints are yielded in such a manner that the density of each sample print coincides with that of the reference print. The condition setup print using the ND negative film is used to yield or produce desired conditions in such a manner that when images of an N negative film are copied using an ND filter, the differences, i.e., balances in color between the respective images are identical to each other by swinging a CC filter nine times. The time-sloping table is used to produce conditions in such a manner that the densities of images at exposure time divided into 260 msec, 1 sec and 1.8 sec are identical to one another. The built-in densitometer correcting print is used to correct variations in density values measured by the densitometer for measuring the density of each color. The condition upkeep print is used to produce conditions for upkeep respective normal exposure conditions of the printer processor 10 by an ND filter.

The operation of the present embodiment will now be described below.

An operator who controls the printer processor 10, sets the paper magazine 12 loaded with the color paper 15 into the printer processor 10. Then, the operator sets the negative film 21 in the negative-film carrier 19 and then instructs the printer processor 10 to start a desired process.

When the printer processor 10 is instructed to start the process, the unillustrated light of the light source unit 11 in the copying unit 16 emits light to allow for positioning of the negative film 21. Then, light exposure is calculated, and the unillustrated filters of the light source unit 11 are moved based on the calculated exposure so as to release the shutter of the optical system 29. As a result, the light emitted from the light source passes through the filters and the negative film 21 so as to expose the color paper 15 positioned in an exposure position within the exposure chamber 14.

The color paper 15 on which an image has been printed by the copying unit 16, is subjected to respective processes in the processor 25. The color paper 15 conveyed from the reservoir 18 is wetted with the developer in the color-producing developer 20, for development. The color paper 15 developed by the color-producing developer 20 is wetted with the liquid fixer in the bleaching fixing unit 22, for fixing. The color paper 15, which has been subjected to fixing, is conveyed to the washing units or tanks 24 for washing. The washed color paper 15 is then cut by the cutter unit 34 to separate each image and then discharged into the sorter 39 so that the cut papers 15 are accumulated therein.

A description will now be made of a process for creating a sample print as the condition producing print 54 by the printer processor 10 and producing conditions using the sample print.

Figure 5:
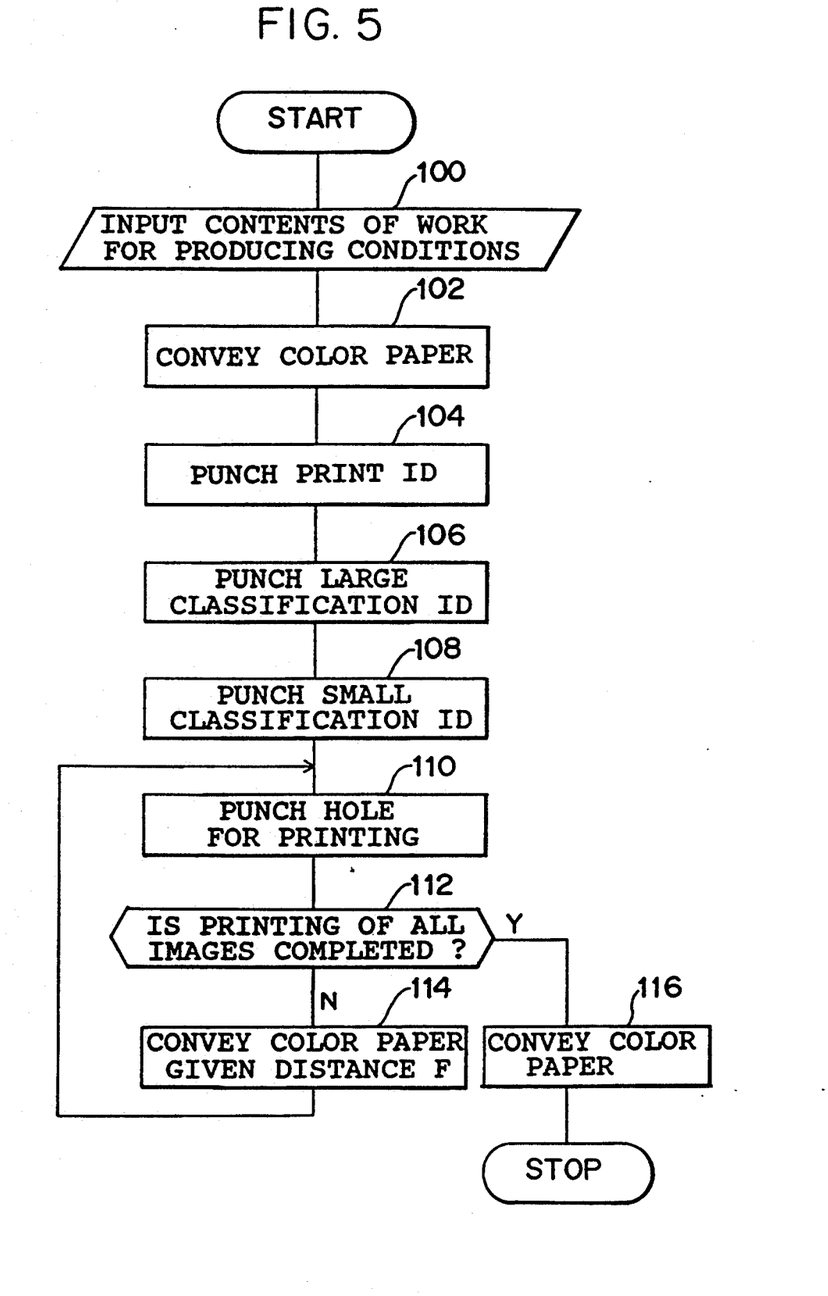
FIG. 5 is a flowchart for describing the operation of a copying unit.

FIG. 5 shows a flowchart describing the procedure for creating the condition producing print 54. In Step 100, the keys of the keyboard of the control panel 59 are operated to input the contents of work corresponding to the large classification and small classification setup to yield the conditions. Consequently, the control device 40 determines the contents of the work, i.e., the negative film to be used, exposure of each color, exposure time, the number of images, the sequence of work, etc. In Step 102, the color paper 15 is pulled out and conveyed in a desired direction. Next, the pulse motor 72 is energized to cause the leading end of the color paper 15 to pass through the hole punching device 56. Thereafter, the hole punching device 56 defines the print ID55 in the color paper 15 (Step 104). The large classification ID64 and the small classification ID66 corresponding to the contents of the work, which have been input via the keys on the keyboard of the control panel 59, are successively defined, i.e., punched in the color paper 15 (Steps 106, 108). The print ID55, the large classification ID64 and the small classification ID66 are defined or punched in the color paper 15 while the color paper 15 is conveyed at intervals of distances G.

Next, the routine procedure proceeds to Step 110. In Step 110, a printing process is performed according to the large classification and the small classification. Respective images corresponding to the large and small classifications are printed on the color paper 15. In addition, the hole punching device 56 is activated to punch the hole 62A in one of the transversely-extending both ends of the color paper 15. It is confirmed in Step 112 whether or not the printing of the images corresponding to the large and small classifications on the color paper 15 has been completed over all of the frames. It the answer is determined to be NO in Step 112, the routine procedure proceeds to Step 114, where the color paper 15 is conveyed at intervals of distance F. In addition, the printing of the images 60 on the color paper 15 and the punching of the corresponding holes 62 in the color paper 15 are successively performed. When the sample print is created, the print ID55, the large classification ID64, and the small classification ID66 are defined in the color paper 15 by the punched holes a through 1. In addition, the punched holes 62 for indicating the positions of images are formed in a series with these IDs. Therefore, these punched holes can be defined in the color paper 15 by the same hole punching device 56. It is also unnecessary to provide a means for applying a plurality of marks on the color paper 15 in the printer processor 10. Moreover, the printer processor 10 is relatively simple in structure.

When the printing of the images corresponding to the large and small classifications on the color paper 15 has been completed, the color paper 15 is conveyed to the processor 25 via the reservoir 18 in Step 116.

The condition producing print 54 as the condition setup print is created by using bull's eye negative films such as a U negative film, an N negative film, an O negative film and an Oo.MDSD/.MDNM/ negative film as follows. That is, the print ID55 is first represented by the holes a through d punched in the color paper 15 as shown in Table 1. Thereafter, the large classification ID64 is represented by "1001" successively defined based on the result of a determination made as to whether the holes e through h have been punched in the color paper 15. Next, the small classification ID66 is represented by "1101" successively defined based on the presence and absence of holes i through l. As a result, the large classification ID64 and the small classification ID66 are represented as illustrated in FIG. 3B. Incidentally, let's assume that the condition producing process is performed in such a manner that the respective bull's eye negative films are exposed two by two to create eight prints with eight images formed thereon.

Next, the respective bull's eye negative films are successively set in the negative carrier 19. The four kinds of bull's eye negative films comprising the U negative film, the N negative film, the O negative film and the Oo negative film are exposed twice in that order. At this time, the number of times in which they are exposed are counted by a counter in the control device 40. First, the U negative film is set in the negative carrier 19, and then exposed under the normal exposure condition for the underexposure negative film, which has been setup in the printer processor 10 so as to print the image 60A on the color paper 15. At the same time, the hole 62A corresponding to the image 60A is punched in the color paper 15 by the hole punching device 56. After the color paper 15 has been conveyed in a desired direction by a distance F, it is subjected to a second exposure so as to form the image 60B on the color print 15 and punch the hole 62B therein. Next, the next N negative film is set in the negative carrier 19 and the color paper 15 is subjected to two exposures. Further, the O negative film and the Oo negative film are repeatedly exposed in that order under the normal exposure condition of the printer processor 10 corresponding to the exposure condition of each of the O and Oo negative films. Thus, the holes a through 1 and the holes 62A through 62H corresponding to the condition producing print 54 shown in FIGS. 3A and 3B are punched in the color paper 15 and the images 60A through 60H are printed on the color paper 15.

Thereafter, the color paper 15 is subjected to development in the processor 25 to create the condition producing print 54 as the sample print.

The created condition producing print 54 is conveyed to the density measuring unit 28, the punched-hole detecting unit 33 and the cutter unit 34 in that order. The operation of each of the units 28, 33 will now be described below with reference to a flowchart shown in FIG. 6.

Figure 6:
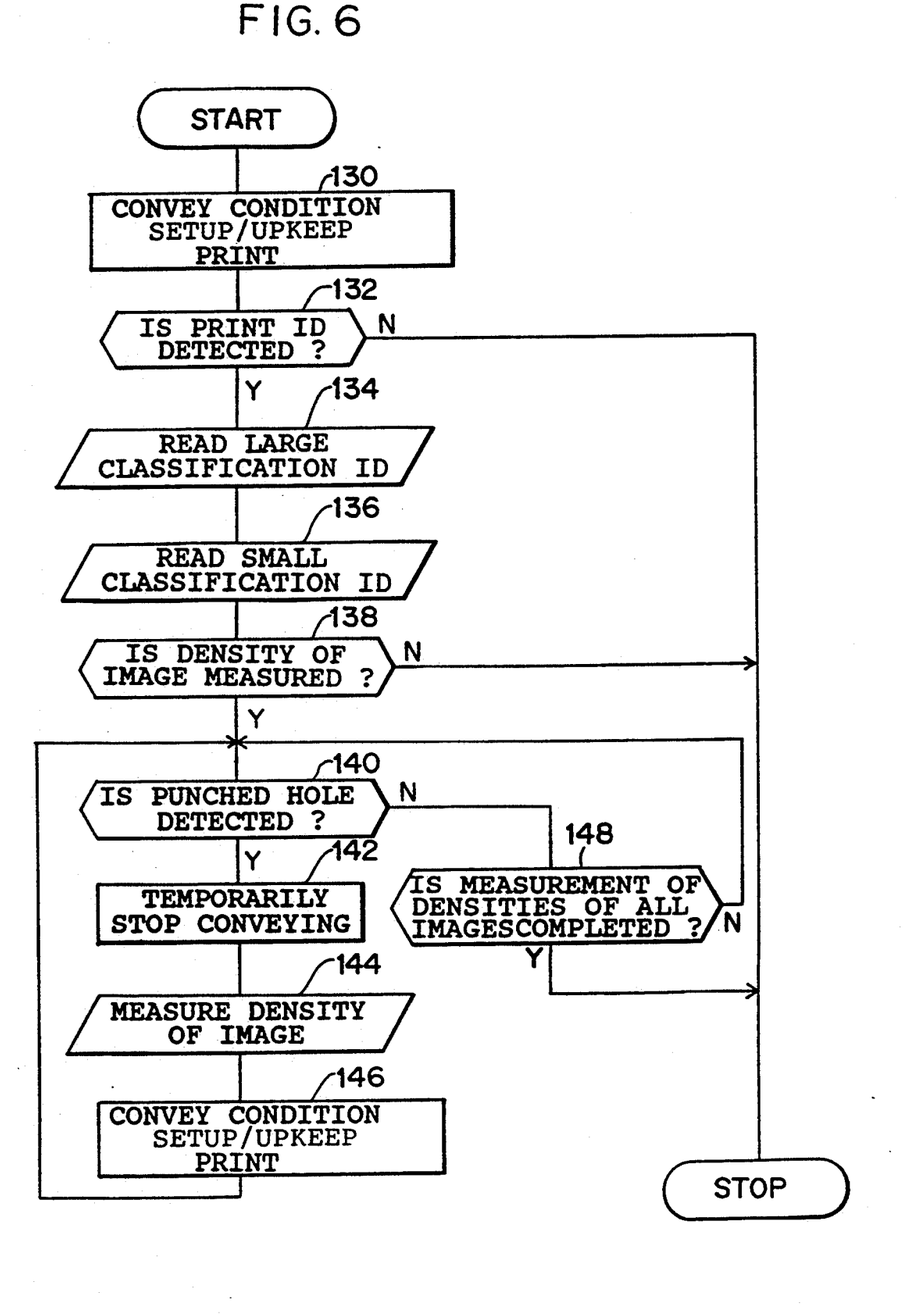
FIG. 6 is a flowchart for describing the operation of the image density measuring unit.

In Step 130, the pulse motor 42 is energized to rotate the conveying roller 31 so as to convey the condition producing print 54 in a desired direction within the density measuring unit 28. It is then determined in Step 132 whether the punched-hole detecting unit 33 has detected the punched holes a through d indicative of the print ID55 in response to a signal output to the light-receiving components 52 from the light-emitting components 50. When the print ID55 is detected, the control device 40 confirms it as the condition producing print 54.

Next, the control device 40 is activated to energize the pulse motor 42 so as to convey the condition producing print 54 in a desired direction at intervals of the distances G, thereby reading the large classification ID64 and the small classification ID66 (Steps 134, 136). It is determined in Step 138 whether or not the densities of images have been measured based on the large classification ID64 and the small classification ID66 in order to produce conditions. That is, if the operator visually determines whether the large classification ID64 represents the round print for setup the normal exposure condition, it is then unnecessary to measure the density of each image with the density measuring unit 28. Thus, the color paper 15 is discharged without measuring the densities of the images.

If it is determined in Step 138 that the control device 40 has measured the density of the image, then the pulse motor 42 is energized to convey the condition producing print 54 in a desired direction to thereby cause the control device 40 to detect the punched holes 62 (Step 140). When the punched holes 62 are detected, the pulse motor 42 is de-energized in Step 142 to measure the densities of the images 60 on the condition producing print 54 facing the densitometer 30 of the density measuring unit 28 (Step 144).

In the present embodiment, the interval between each density measuring portion of the images 60 and each of the punched holes 62 corresponding to the images 60 is set to a given distance E, whereas the interval between a measuring position of the density measuring unit 28 and a punched-hole detecting position of the punched-hole detecting unit 33 is set to the given distance E. Therefore, when the punched holes 62 are detected, each density measuring portion (each position indicated by "x" in FIG. 3A) of the images 60 on the condition producing print 54 is held in the density measuring position of the density measuring unit 28. Accordingly, when the conveying of the condition producing print 54 in a desired direction is stopped upon detection of the punched holes 62, the density measuring unit 28 can measure the densities of the images 60 positioned in the measuring position. That is, the positioning of the images 60 in the measuring location of the density measuring unit 28 can be easily and accurately performed. Since the punched holes 62 are arranged in series with the ID55, ID64 and ID66, the punched holes 62 can be detected by the same punched-hole detecting unit 33. It is also unnecessary to specially provide an image position reading means for positioning each of the images 60.

This density measuring operation of each of the images 60 is repeated while the condition producing print 54 is being conveyed (Step 146). The detection of the punched holes 62 is performed while confirmation is being made as to whether or not the densities of images of a given frame have been measured based on information obtained from the large classification ID64 and the small classification ID66 (Step 148). If it is determined that the densities of images of all of the frames have been measured, then the control device 40 is activated to energize the pulse motor 42 to convey the condition producing print 54 to the cutter unit 34. Thereafter, the condition producing print 54 is cut at a position corresponding to an upstream end of a ninth image so as to be discharged into the sorter 39.

On the other hand, the density measuring unit 28 measures the density of the condition producing print 54 as the sample print, and also measures the density of the reference print. Incidentally, the density of the reference print may be measured before the density of the sample print is measured.

When the created condition producing print 54 is used as the reference print, it is inserted in a conveying path of the density measuring unit 28 from an unillustrated insertion hole. Thereafter, the control device 40 is activated in accordance with the flowchart shown in FIG. 6 to measure the density of each image. That is, the control device 40 can reliably read copy conditions of respective images copied on the reference print because the large classification ID64 and the small classification ID66 of the condition producing print 54 are read. Since the created data such as the date, etc. are printed on the reverse side of the print 54, the operator can confirm the data and use it. Since a series of images are continuously printed on the print 54, the order for printing the images is free from mistakes. Thus, even if the created condition producing print 54 is used, the exposure conditions can reliably be set without operational mistakes by the operator.

The control device 40 measures the densities of the images on the sample print and the reference print both of which are used as the condition producing print 54. Then, the control device 40 modifies and sets the normal exposure conditions of both prints based on data about the measured densities in such a manner that the measured density of the image on the sample print coincides with that of the image on the reference print. Thus, when an image on the negative film 21 is exposed onto the color paper 15, the control device 40 can suitably control the light source unit 11 and the optical system 29.

In the present embodiment, the condition producing print 54 is created and the density of the image on the condition producing print 54 is measured in accordance with the flowchart shown in FIGS. 5 and 6. However, a condition-producing control method is not necessarily limited to the method employed in the present embodiment. The following condition-producing control method may alternatively be used as an example. That is, the leading end of the condition producing print 54 is first detected by the light-emitting component 50 and the light-receiving component 52 of the punched-hole detecting unit 33. After the condition producing print 54 has been conveyed a given distance from the leading end thereof, the print ID55 is detected and the densities of images on the condition producing print 54 are measured based on the result of the detection. As an alternative to the above method, the following method may also be adopted. That is, when the print ID55 is not detected, it is determined in Step 102 that the condition producing print 54 is of a normal print. The normal print is then cut by the cutter unit 34.

When the density measuring unit 28 measures the density of each image, the densitometer 30 measures only the density of an image at the center of the whole image, which is extremely narrow in area. Therefore, the length of each of the images 60 is made short along the condition producing print conveying direction in the present embodiment. Thus, the image copying regions of the condition producing print 54 is reduced and the mark forming regions in which the print ID55, the large classification ID64 and the small classification ID66 or the like are set, are formed on the condition producing print 54. If the mark forming regions are not superposed on density measuring portions of the images 60A through 60I, then the mark forming regions may be superposed on the image copying regions.

In the present embodiment, the holes a through l and the holes 62A through 62I are punched in the color paper 15 as marks by the hole punching device 56 so as to form the condition producing print 54. However, these marks are not limited to the punched holes. For example, cut-away portions having desired configurations such as a semicircle, a wedge, etc. may be formed in side edges of the color paper 15. Alternatively, marks may be printed on the reverse side of the color paper 15. In this case too, if identification marks and image position marks are arranged in series, then they can be detected by a single mark detecting means.

In the present embodiment, the distance between the exposure position in the exposure chamber 14 and the hole punching position of the hole punching device 56 is equal to the distance between the density measuring position of the density measuring unit 28 and the punched-hole detecting position of the punched-hole detecting unit 33. However, they may of a different distance. When the distance between the exposure position in the exposure chamber 14 and the hole punching position of the hole punching device 56 is longer than that between the density measuring position of the density measuring unit 28 and the punched-hole detecting position of the punched-hole detecting unit 33, information about the difference between the two distances is stored in the control device 40 in advance. After the punched holes have been detected, the condition producing print 54 may be conveyed a distance corresponding to the difference so as to measure the densities of images. At least the image density measurement should be carried out after a desired identification mark has been detected. Alternatively, the number of images subjected to density measurement can be identified on an identification mark and the densities of the images may be measured a predetermined number of times after an image position mark has been detected.

As described above, a condition setup/upkeep print is used to produce conditions by identification marks comprised of combined IDs set in mark forming regions, and to exhibit copy conditions of copied images. When the identification marks are read, a photographic printer accurately detects or determines the copy conditions of the copied images to enable conditions for setup of the exposure conditions to be produced. The mark forming regions have image position marks which are used to indicate the positions of respective images copied onto image regions and which are arranged in series with the identification marks. The positions of the images can be accurately identified by successively detecting the image position marks with a use of one of ID sensors.

Thus, the condition setup/upkeep print can allow the condition creation or development for setup and upkeep of normal exposure conditions of a photographic printer can be simply performed without any operational mistake.

Having now fully described the invention, it will be apparent to those skilled in the art that many changes and modifications can be made without departing from the spirit or scope of the invention as set forth in the appended claims.

What is claimed is:

1. A condition setup/upkeep print for either setup or upkeep of normal exposure conditions of a photographic printer, comprising:
   a plurality of images copied under at least two different copy conditions; and
   copy condition indicating means for indicating copy conditions associated with each of said plurality of images, said copy conditions being represented by one set of identification marks.

2. A condition setup/upkeep print according to claim 1, wherein said plurality of images are copied from images on standard negative films.

3. A condition setup/upkeep print according to claim 2, wherein said copy condition indicating means has print identification means which indicates whether or not said plurality of images are images for a setup of normal exposure conditions.

4. A condition setup/upkeep print according to claim 3, wherein said copy condition indicating means has standard negative-film classifying identification ID means which indicates the kinds of said standard negative films for said plurality of images.

5. A condition setup/upkeep print according to claim 4, wherein said copy condition indicating means has contents-of-work classifying ID identification means which indicates the contents of work for copying said plurality of images on the print.

6. A condition setup/upkeep print according to claim 5, further comprising:
   image position indicating means for indicating the positions of said plurality of images.

7. A condition setup/upkeep print according to claim 6, wherein said copy condition indicating means and said image position indicating means formed in mark forming regions defined on said condition setup/upkeep print.

8. A condition setup/upkeep print according to claim 2, wherein said plurality of images are formed on image copying regions defined on said condition setup/upkeep print.

9. A condition setup/upkeep print according to claim 7, wherein said copy condition indicating means and said image position indicating means are arranged in series along the longitudinal direction of said condition setup/upkeep print.

10. A condition setup/upkeep print according to claim 9, wherein said copy condition indicating means is disposed at a position near each transversely-extending end of said condition setup/upkeep print.

11. A condition setup/upkeep print according to claim 10, wherein said image position indicating means is disposed at a position near one of the transversely-extending both ends of said print.

12. A condition setup/upkeep print according to claim 11, wherein said copy condition indicating means is disposed at either one of upstream and downstream sides of said plurality of images.

13. A condition setup/upkeep print according to claim 12, wherein said image position indicating means is disposed in each of said mark forming regions in association with each of said plurality of images.

14. A condition setup/upkeep print according to claim 13, wherein said copy condition indicating means is an identification mark formed on said condition setup/upkeep print, said image position indicating means is an image position indicating mark formed on said condition setup/upkeep print, said print identification means is a print identification mark formed on said condition setup/upkeep print, said standard negative film classifying identification means is a standard negative film classifying identification mark formed on said condition setup/upkeep print, and said contents-of-work classifying identification means is a contents-of-work grouping identification mark formed on said condition setup/upkeep print.

15. A condition setup/upkeep print according to claim 14, wherein said identification mark and said image position indicating mark are represented by holes punched in said condition setup/upkeep print.

16. A condition setup/upkeep print according to claim 15, wherein the identification marks are constructed such that said print identification mark, said standard negative film classifying identification mark and said contents-of-work classifying identification mark have four hole punching positions respectively, and each of said print identification mark, said standard negative film classifying identification mark and said contents-of-work classifying identification mark indicating said copy conditions, one of said conditions being specified by the presence or absence of a punched hole at least one of the four hole punching positions.

17. A condition setup/upkeep print for either setup or upkeep of normal exposure conditions of a photographic printer, comprising:
- a plurality of image copies from images of standard negative films under at least two different copy conditions;
- a print identification mark for indicating whether or not said plurality of images are images for setup of normal exposure conditions;
- a standard negative film classifying identification mark for indicating the kinds of said standard negative films for said plurality of images;
- a contents-of-work classifying identification mark for indicating the contents of work for printing of said plurality of images; and
- an image position indicating mark for indicating the positions of said plurality of images.

18. A condition setup/upkeep print according to claim 17, wherein said plurality of images are formed on image copying regions defined on said setup/upkeep print.

19. A condition setup/upkeep print according to claim 18, wherein said print identification mark, said standard negative film classifying identification mark, said contents-of-work classifying identification mark and said image position indicating mark are formed on mark forming regions defined on said print, and arranged in series along the longitudinal direction of said setup/upkeep print.

20. A condition setup/upkeep print according to claim 19, wherein said print identification mark, said standard negative film classifying identification mark and said contents-of-work classifying identification mark are disposed in one of upstream and downstream sides of said plurality of images as a set of identification marks and disposed in positions near transversely-extending ends of said setup/upkeep print.

21. A condition setup/upkeep print according to claim 20, wherein said image position indicating mark is disposed at a position near one of the transversely-extending ends of said setup/upkeep print.

22. A condition setup/upkeep print according to claim 21, wherein said image position indicating mark is disposed at each of said mark forming regions in association with each of said plurality of images.

23. A condition setup/upkeep print according to claim 22, wherein said print identification mark, said standard negative film classifying identification mark, said contents-of-work classifying identification mark and said image position indicating mark are represented by punched holes, said print identification mark, said standard negative film classifying identification mark and said contents-of-work classifying identification mark have four hole punching positions respectively, and holes being punched in none or any of the four hole punching positions so as to indicate one of said copy conditions.

* * * * *